Figure 1:
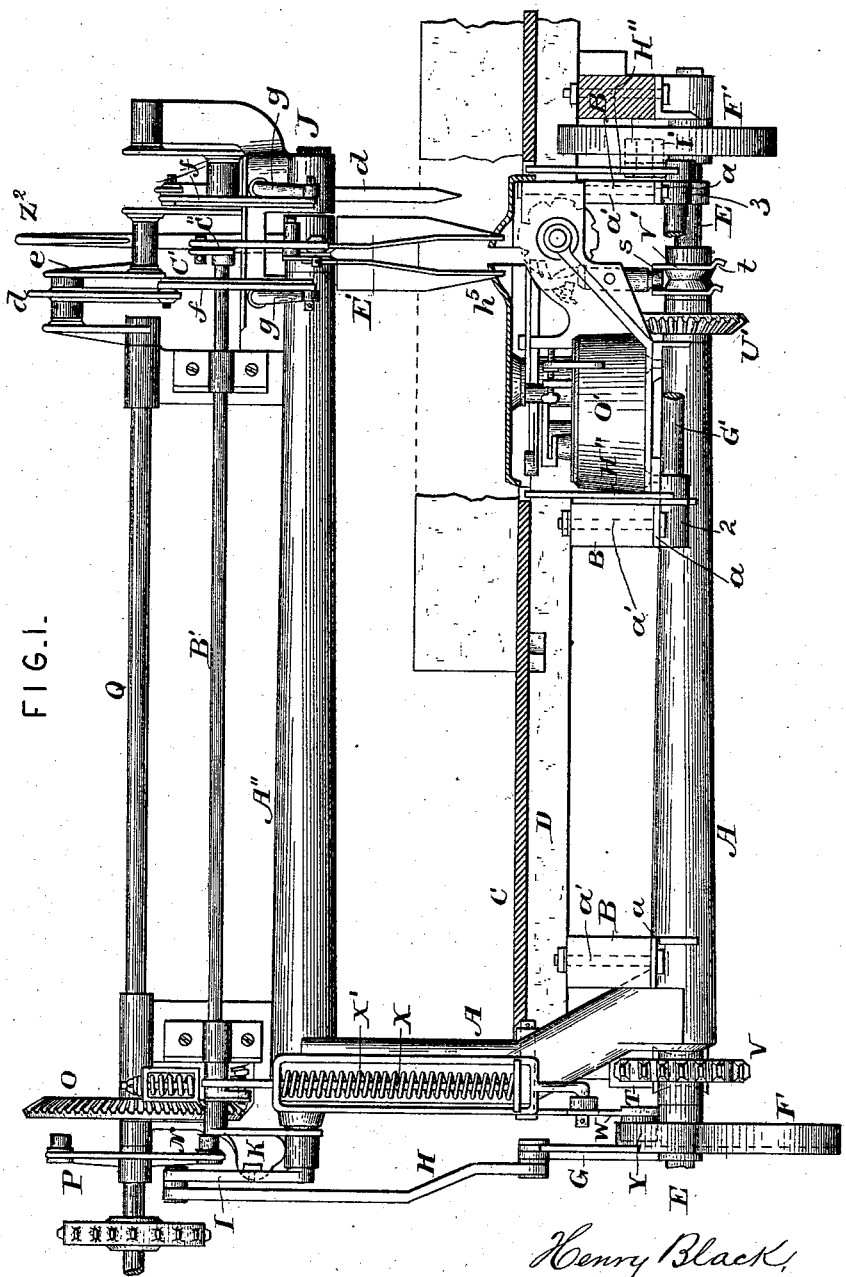

(No Model.) 5 Sheets—Sheet 1.

H. BLACK & A. T. MILLER.
HARVESTER AND BINDER.

No. 347,286. Patented Aug. 10, 1886.

(No Model.) 5 Sheets—Sheet 2.

H. BLACK & A. T. MILLER.
HARVESTER AND BINDER.

No. 347,286. Patented Aug. 10, 1886.

ATTEST—
J Henry Kaiser
Harry L. Amer.

INVENTORS.
Henry Black,
Allen T. Miller
By Wm C. McIntire
Atty.

(No Model.)
5 Sheets—Sheet 3.
H. BLACK & A. T. MILLER.
HARVESTER AND BINDER.
No. 347,286.
Patented Aug. 10, 1886.
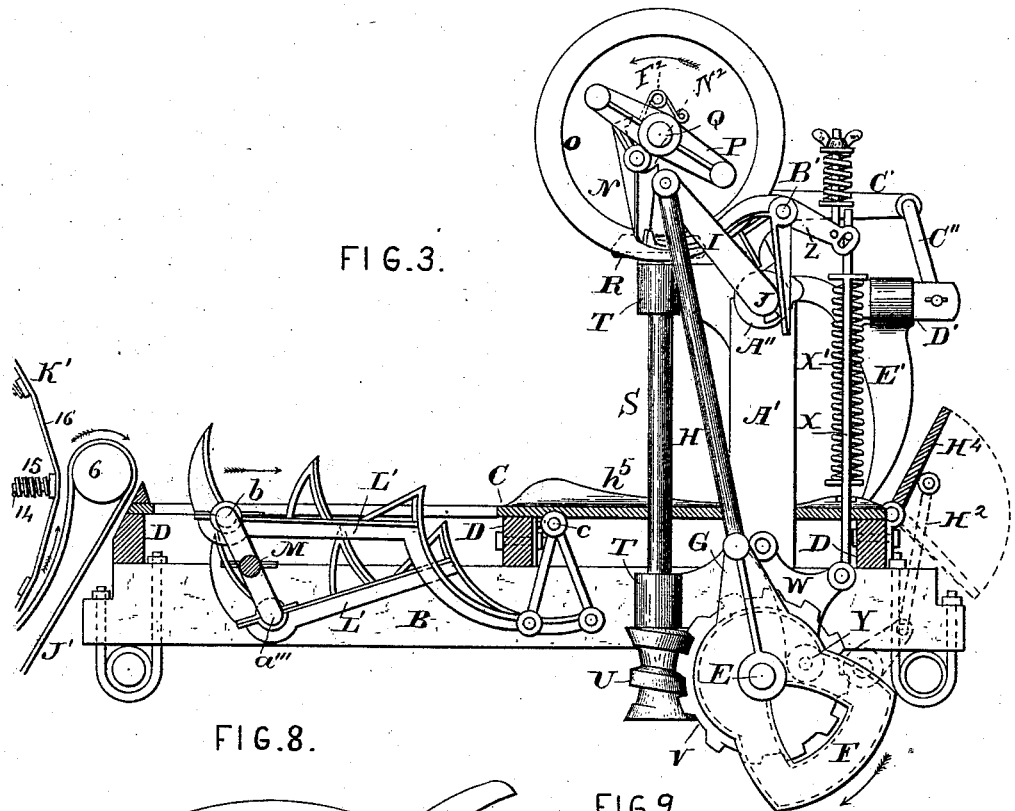
FIG.3.
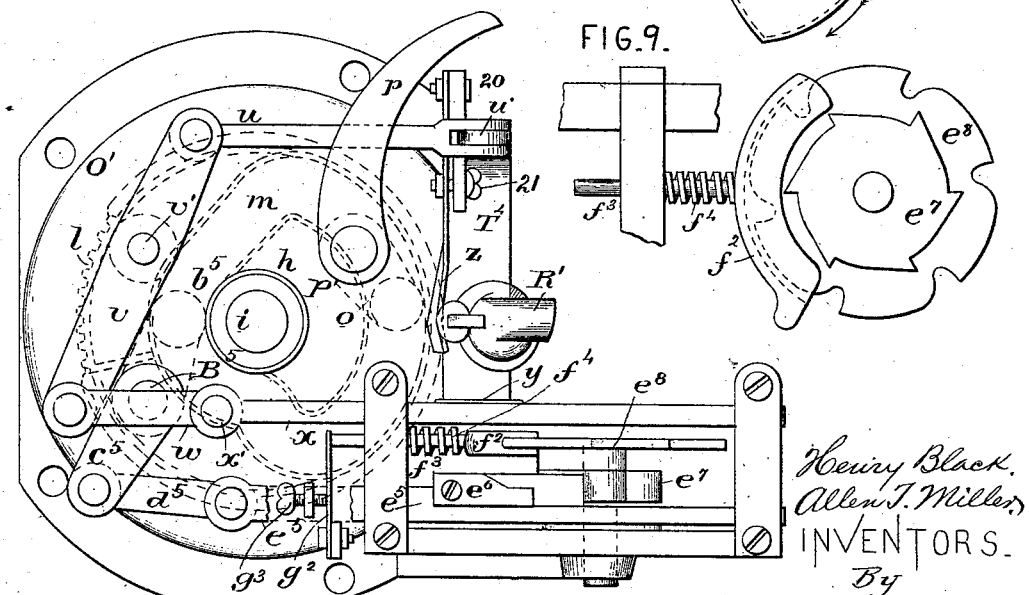
FIG.8.
FIG.9.
ATTEST
J. Henry Kaiser
Harry L. Amer
Henry Black
Allen T. Miller
INVENTORS.
By
Wm. C. McIntire
Atty (No Model.)  5 Sheets—Sheet 4.

H. BLACK & A. T. MILLER.
HARVESTER AND BINDER.

No. 347,286.  Patented Aug. 10, 1886.

ATTEST-
J. Henry Kaiser
Harry L. Amer

Henry Black,
Allen T. Miller,
INVENTORS.
By
Wm. C. McIntire,
Atty.

(No Model.) 5 Sheets—Sheet 5.

H. BLACK & A. T. MILLER.
HARVESTER AND BINDER.

No. 347,286. Patented Aug. 10, 1886.

ATTEST—
J. Henry Kaiser
Harry L. Amer

INVENTORS—
Henry Black
Allen T. Miller
By Wm. C. McIntire
att'y

UNITED STATES PATENT OFFICE.

HENRY BLACK AND ALLEN T. MILLER, OF GREENVILLE, OHIO, ASSIGNORS OF FIFTY-TWO ONE-HUNDREDTHS TO JOHN H. MARTIN, E. B. HUSSEY, JAMISON & MARTZ, AS PARTNERS, AND JOHN R. KNOX, ALL OF SAME PLACE.

HARVESTER AND BINDER.

SPECIFICATION forming part of Letters Patent No. 347,286, dated August 10, 1886

Application filed January 13, 1886. Serial No. 188,435. (No model.)

*To all whom it may concern:*

Be it known that we, HENRY BLACK and ALLEN T. MILLER, citizens of the United States, residing at Greenville, in the county of Darke and State of Ohio, have invented a new and useful Harvesting-Machine, of which the following is a specification, to wit:

This invention relates to certain new and useful improvements in grain-binders for harvesters; and it consists, substantially, in the parts as constructed, their particular combinations with each other, and in such other details as will hereinafter be more particularly described and pointed out in the claims.

The objects of the invention are, first, to lessen the number of parts constituting the knotter mechanism, and to so arrange the same beneath the binder-platform as to permit the latter to be brought into much closer proximity to the ground than heretofore, the construction and arrangement thereof also greatly reducing the weight of such mechanism as compared with many former inventions.

Second, our invention has for its object to provide a simplified form and arrangement of cutting devices, by which an effective severance of the cord or twine is insured immediately after each sheaf or bundle has been done up and tied.

Another object of our invention is to provide suitable means for automatically discharging the bundles over the side of the binder-platform; and also to provide against loss of grain from the side of the binder-platform by arranging alongside thereof a hinged or swinging board or gate operating in conjunction with the automatic discharge-arms.

Further objects of the invention appear more fully from the description hereinafter following.

Figure 2:
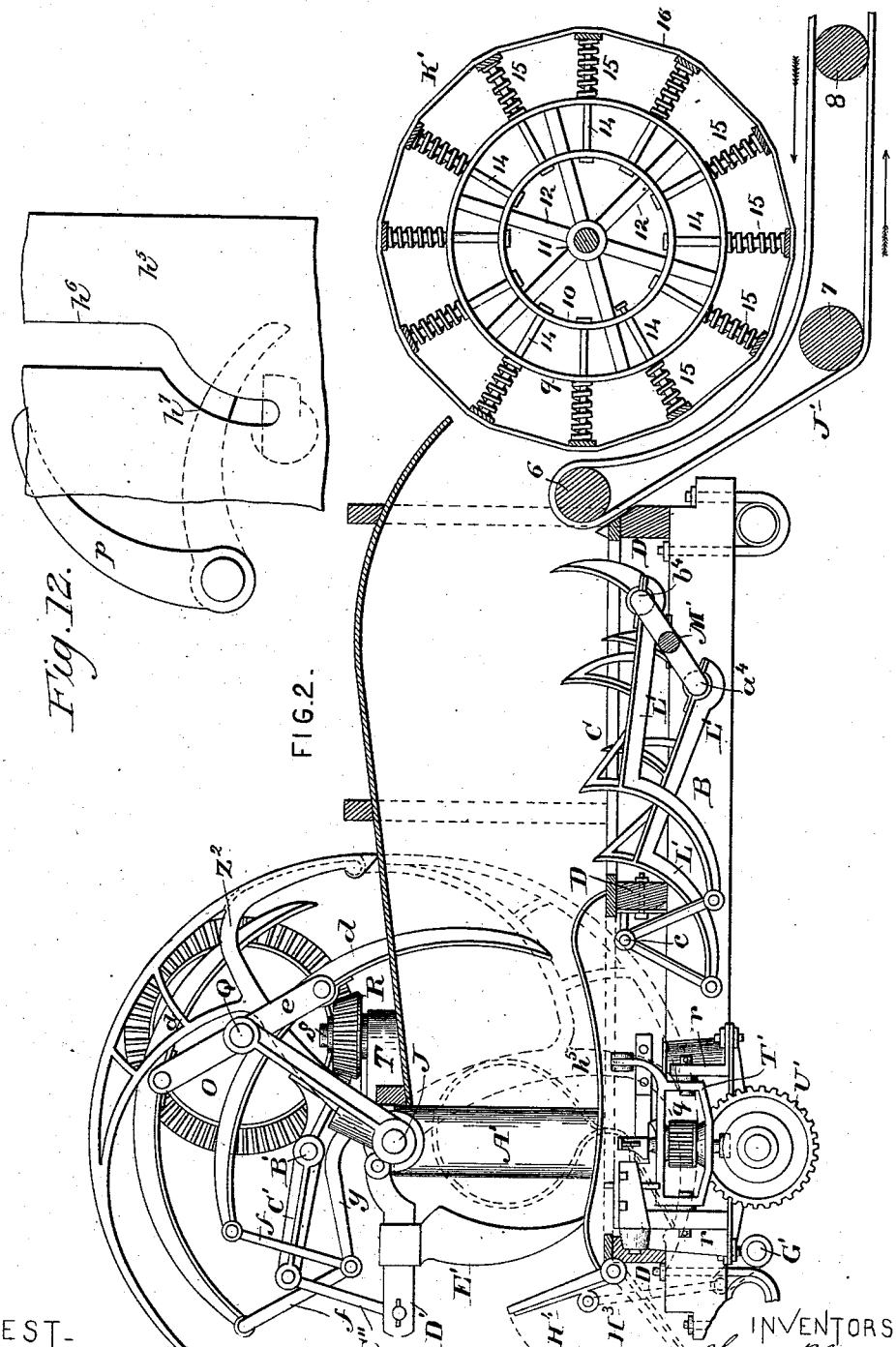
Figure 4:
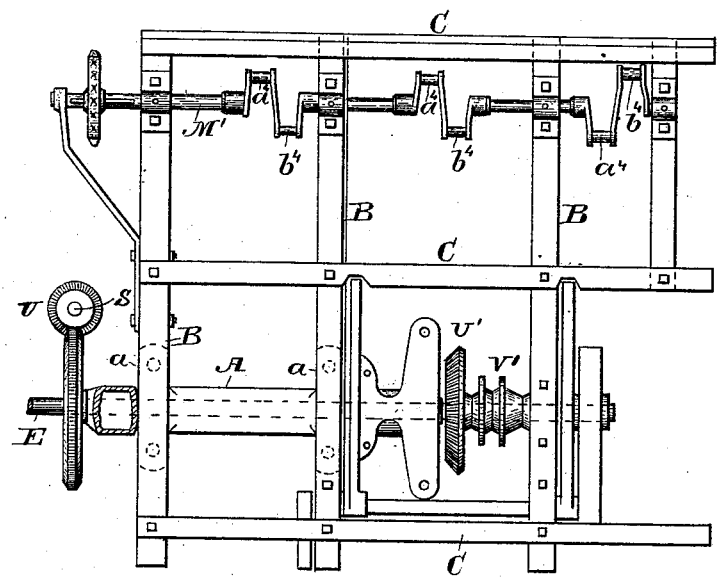
Figure 5:
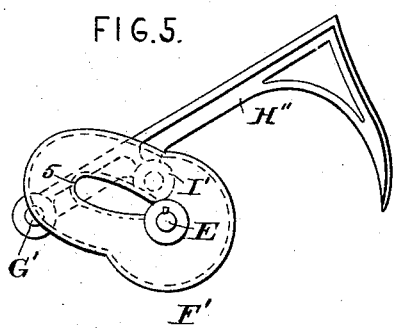
Figure 7:
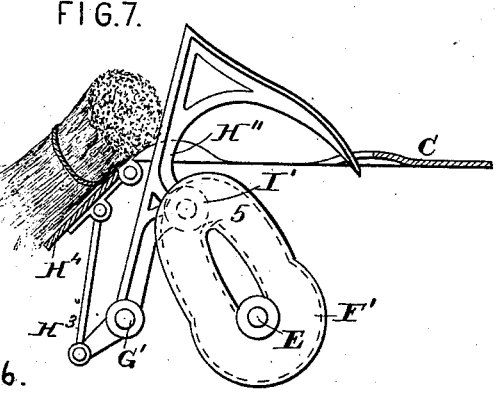
Figure 6:
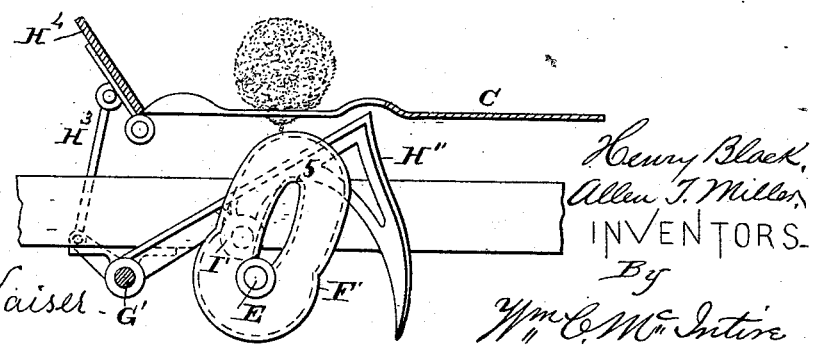
Figure 10:
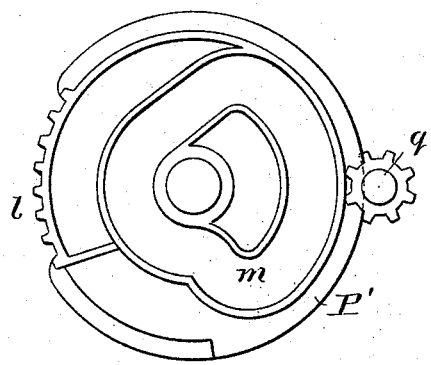
Figure 11:
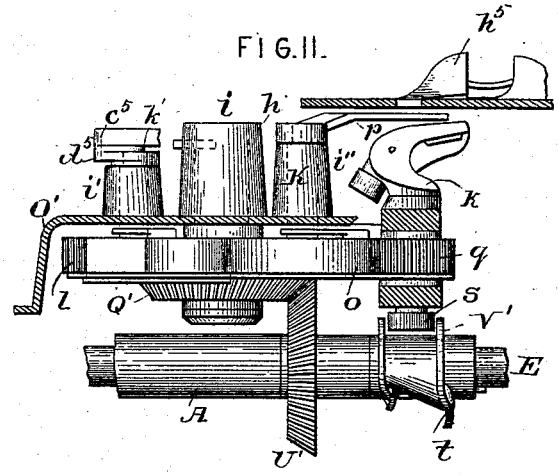
Figure 13:
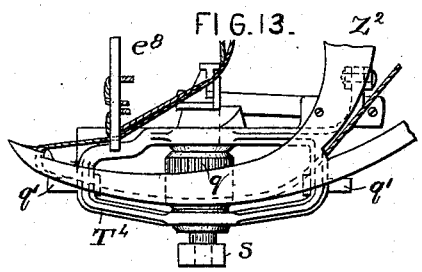

Referring to the accompanying sheets of drawings, Figure 1 is an outer side elevation, partly in section, of a grain-binding machine embodying our invention, the same clearly indicating the location and arrangement of the knotter mechanism beneath the binder-platform, together with the devices located above the platform and directly over the knotter mechanism, which serve to gather or pack the grain into bundles previous to being bound. Fig. 2 is a front elevation thereof, partly in section, the same clearly representing the manner of operation of both the platform-pickers and the vibrating packer-arms, which gather and pack the grain into sheaves or bundles; also indicating in dotted lines the movement of the needle in carrying the cord around the bundles, and showing the knotter mechanism from the right-hand side of that shown in the preceding figure. Fig. 3 is a rear end elevation, partly in section, to represent the mechanism which operates to start and stop the machine, and by which the automatic devices are operated which effect the discharge of the bundle. Fig. 4 is a plan view representing the arrangement beneath the binder-platform of the crank-shaft by which the pickers are operated, and the seat for the knotter mechanism. (Not shown.) Fig. 5 is a detail side view of one of the levers and the actuating-cam by which the sheaf or bundle is automatically discharged over the side of the binder-platform, the said view representing the two in their normal positions. Fig. 6 is a similar view of the discharge-lever and operating-cam, the same showing the position which the cam has assumed with respect to the arm (the arm remaining unmoved up to this time) by the time the bundle has been bound and just ready to act to suddenly lift the arm to discharge the bundle. Fig. 7 represents a like view, and indicating the cam in the position it takes in the act of lifting the arm, by which the discharge of the bundle is effected. Fig. 8 is a top plan view of the knotter mechanism, together with the cutting devices which sever the cord immediately after the formation of the knot. Fig. 9 is a view in detail of the notched disk and the spring-actuated shoe exerting a constant pressure against the edge thereof, by which the cord is held to be brought over and around the sheaf or bundle after its entrance through one of the notches of the disk, and again brought back to be in readiness for severance by the knife. Fig. 10 is a top view of the cam and gear wheel which actuates the knotter mechanism, the same being formed with a groove in which parts of such mechanism work during the movement or rotation imparted to the wheel by the beveled gear to which it is attached, the said cam and gear wheel being also provided with a gear-segment on a portion of its periphery, to engage with and impart motion to the pinion carried by the knot-tyer. Fig. 11 is a detail side view of the knotter mechanism, the same illustrating the manner in which the cam and gear wheel is operated through the medium of the beveled gearing. The remaining figures are all detail views representing the action of the knotter proper, the manner of forming the knot, and also indicating the way in which the knotter is swung aside automatically to shed the loop.

Reference being had to the several parts by the letters marked thereon, A A' A" represent a single hollow casting constituting the main frame of the machine, and serving to carry or bear the principal shafts, through which motion or movement is exerted to properly operate the several parts, the portion A thereof being located beneath the binder-platform and lengthwise therewith, while the remaining portions are above the platform, as clearly shown in Fig. 1. At suitable intervals along the part A of the said main frame projecting seats or lugs $a$ are formed, by which attachment thereof to the transverse beams B is effected by bolts $a'$, indicated in dotted lines as passing up through the lugs and the ends of the beams, and then secured by nuts, a similar lug also being attached to the beam or sill B, which extends along the platform beyond the part A, by which the said sill is secured in any suitable manner to a projection from the frame. (Not shown.)

D represents strips secured across the beams, upon which the table or platform C is supported.

E is a shaft, which extends through the portion A of the frame, and having thereon, at near one end, a worm-wheel, V, by which the shaft is operated, as will hereinafter appear, and also bearing at the same end a cam, F, formed on its inner surface with a groove which conforms to the general outline thereof, the said cam being the medium through which motion is transmitted to the automatic devices which operate to raise the compressor-arms against which the grain is carried by the vibrating packer-arms.

G is a crank-arm formed with a cam, F, and whose end is pivotally connected to a pitman, H, and the upper end of the pitman is in turn pivotally connected to an arm, I, rigid on one end of a shaft, J, which shaft extends through the overhanging hollow portion A" of the main frame, and is movable therein, as will appear hereinafter.

K is an arm sleeved loosely on shaft J, and is for the usual purpose of tripping the pawl N, pivoted to the side of wheel O.

Pawl N is formed with a lug, $N^2$, which, when the pawl is released from engagement with the end of the trip arm or lever K, acts to engage the cross-head P, which always revolves with the driving-shaft Q, on which it is fixed, and thereby revolves wheel O. The wheel O is loosely mounted on the shaft Q and normally at rest, and is formed with a beveled-gear on its inner face, as shown, which meshes with a beveled gear-wheel, R, mounted upon an upright shaft, S, thereby revolving the latter when the wheel O is clutched to the shaft Q. Shaft S is supported by and works in collars or boxes T T, projecting from the portions A and A" of the main frame, and at its lower end is formed or provided with a screw or worm, U, that engages or meshes with the worm gear-wheel V arranged or keyed to the shaft E in like manner as is the cam F hereinbefore referred to. A bell-crank, W, is pivoted to the lower side of portion A' of the main frame and works or moves intermediate between the cam F and wheel V, one arm of the said crank being connected to the lower end of a rod, X, while at the end of the other arm thereof a small roll, Y, is carried, which works in the cam-groove of cam F.

Z is a lever fixed upon a shaft, B', extending parallel with shaft J, one end of the same being formed with an eye, in which fits the upper end of rod X, as shown.

At near the opposite end of the shaft J the needle $Z^2$ is carried, to the hub of which is attached the inner end of arm D', while to the outer end of said arm is connected the link C", which is also connected to the crank or arm C' attached to the shaft B'. Depending from the arm D' are the compressor-fingers E', against which the grain is packed into bundles, and which are thrown upward at the proper time to permit the discharge of the bundles. This action of the arm carrying the compressor-fingers in raising is effected substantially as follows: After a sufficient amount of grain has been brought up against the fingers they will yield slightly outward, and this slight movement is imparted or communicated to the shaft B', effecting a release of the pawl N. As soon as this is effected, the spring $F^2$ throws the heel of the pawl around to engage with one arm of the cross-head P, thereby causing the wheel O to be locked to the shaft Q, and thereby rotated. The motion of wheel O is communicated to the shaft S, as will be apparent, and thence through wheel V to the shaft E carrying the cam F. The cam revolves with wheel V, the roll Y on the bell-crank W moving in its groove. By virtue of the connection between the crank-arm G (formed with the cam) and the pitman H the latter in the revolution of the cam is drawn down, thereby partially rotating shaft J and consequently bringing down the binder-arm and drawing inward, so as to compress the bundle against the fingers E', and after the bundle is tied by the knotter devices the arm D', with its compressor-fingers, is raised by the cam Y and bell-crank W. Immediately on these devices being raised the bundle is discharged by the devices hereinafter referred to. After the roll Y has passed the point of the cam marked 1 the bell-crank W is pulled down, the pitman is again raised or elevated, and all of the described devices restored to their former positions, the wheel O being stopped until again operated in the manner explained, the spring X' being for the purpose of allowing the compressor-fingers to yield.

On the end of shaft E, opposite to that on which cam F is arranged, another and somewhat differently-shaped cam, F', is located, (for form of which see Figs. 5, 6, and 7,) and supported in bearings 2 and 3, formed on part A of the main frame, is an auxiliary shaft, G', (see Fig. 1,) to which are rigidly fixed the discharge-arms H" H", that work upward through the binder-platform in suitable openings provided therefor, as shown, the rear end of such auxiliary shaft being provided with a crank-arm which is connected through a link, H³, with the tilting board H⁴, hinged to the outer side edge of the binder-platform. The arm H", adjacent to the cam F', is provided with a pin on its side, on which is placed a roller, I', that moves in the groove formed on the adjacent side of the said cam. Thus, when the latter is revolved the discharge-arms will be elevated and the auxiliary shaft rotated, carrying the tilting board downward to permit the bundle to be discharged. After the roller I' passes the point of the cam marked 5, Figs. 5, 6, and 7, the discharge-arms are again brought downward or restored, they having discharged the bundle over the side of the platform in the manner indicated in Fig. 7. It should be here stated that the arrangement of cams F and F' with respect to each other is such that the operation of the latter in elevating the discharge-arms takes place directly after the bundle has been bound and the compressor-fingers E' elevated.

As represented in Fig. 2, the elevator for raising the grain from the harvester-platform to the binder-platform consists of a single belt, J', traversing the rollers 6, 7, and 8, while located above the belt in proper bearings is a spring-drum, K', by which the grain is held upon the belt in such manner as to be evenly and regularly elevated. The drum is constituted of two concentric bands, 9 10, held in proper relation to each other and to the hub 11 by means of the radial ribs or spokes 12. A series of headed rods, 14, pass through the two bands and project outwardly, as shown, each one of which carries a spring, 15, and surrounding them at their outer ends is a covering or band, 16. This construction is for allowing a yield to any obstruction which may be encountered in the elevation of the grain by the elevator-belt, and thus being distinguished from a simple solid drum.

L' represents the pickers working up through openings in the binder-platform, and by which the grain is taken to the pivoted vibrating packers. These pickers are preferably arranged in pairs, three of such pairs being resorted to in our invention, although it is obvious that as many may be used as is found to be preferable, and they are operated by means of a crank-shaft, M', which extends lengthwise of the under side of the machine. (See Fig. 4.) Double cranks are formed at intervals on the shaft, as represented by the letters $a^4 b^4$, one of the pickers of a set being secured to $a^4$ and the other to $b^4$, and it is apparent that in the operation of shaft M' the pickers will be caused to alternately work back and forth through the platform. The opposite ends of the pickers are pivotally suspended beneath the platform, as seen at $c$, and it will be observed that the crank at one end of the shaft M' is formed somewhat longer than the others, which is for the purpose of having the pickers carried thereby to reach out a little in advance of the others, to better assist in carrying back the "butt-ends" of the grain whose tendency is to remain behind.

$d d$ represent the pivoted vibrating packers, which pack the grain into bundles against the compressor-fingers E, the same consisting of curved arms $d d$, centrally connected to a double crank, $e$, carried by the shaft Q, and whose rear ends are pivotally connected, by means of links $f$, to the end of a stationary bracket, $g$, projecting from the main frame. In the operation of shaft Q the packers are caused to alternately describe ellipses in their downward movement, thereby carrying the grain up against the compressor-fingers.

The knotter mechanism is contained or arranged in a case or hood, the same being formed about centrally with a hollow projection, $h$, for the reception and bearing of a spindle, $i$, which carries at its lower end a revolving cam and gear-wheel, P', and beveled gear-wheel Q', the two latter being integral or united. Similarly formed with the case are additional projections, $i' i''$, which form bearings for spindles $k k'$, operating other devices hereinafter mentioned. The cam and gear-wheel P' is formed on a portion of its edge or periphery with cogs $l$, while on its top surface a groove, $m$, is formed, in which works the crank end $o$ of post or spindle $k$, thereby vibrating the latter when the cam and gear-wheel is rotated, and causing the tucker $p$, carried thereby, to be brought around in such manner as to carry the two strands of the applied band to within reach of the jaws of the knotter, so as to be caught by the latter. The cogs $l$, formed on the periphery of the cam and gear-wheel P' are for engaging at certain intervals a pinion, $q$, carried on the shaft of the knot-tyer R', by which the latter is rotated to form the knot in the usual manner of operation of such devices. T⁴ represents a yoke or frame in which the knotter proper is held or supported, the same being provided with pintles $q' q'$, by which it is pivotally supported in bearings $r r$, formed on the shield or hood O'; and carried also on the lower end of the knotter-shaft is a small roller, $s$, for a purpose hereinafter described.

The purpose of having the knotter supported in the pivotally-suspended frame is to permit it at the proper time to be tilted or thrown to one side, causing the knotter to shed the loop after the knot has been tied, and also tightening the knot with but little liability of breakage of the cord.

A beveled gear-wheel, U', is secured upon the shaft E at a point to mesh with wheel Q', and upon the same shaft a cam, V', is carried, the same being formed with a circumferential cam-groove, as shown, having an irregular or outward turn, as indicated at $t$. This groove is for the reception of the roller $s$, carried by the knotter-shaft, and the purpose of the deflection or jog $t$ is to cause the throw of the knotter and frame, for it is evident that when the turn or bend is met by the said roll the tilt of the yoke or frame $T^4$ will be effected. (See Fig. 20.) The action of thus tilting or swinging the knotter frame or yoke also operates the knife-bar, as will now appear.

$u$ represents a lever, (see Fig. 8,) which is connected at one end to an arm projecting from the frame $T^4$ above the pivot at $u'$, and connected or linked at its opposite end to another lever, $v$, that turns on a pivot, $v'$, extending up from the cap O', the other end of $v$ being connected in like manner to a link, $w$, as shown, to which the knife-bar $x$ is pivoted, as at $x'$, the knife being carried at its forward end and designated by the letter $y$. By this construction and arrangement it will be seen that when frame $T^4$ is tilted or thrown laterally the knife-bar $x$ will be operated with positive force to sever the cord.

$z$ represents a flat spring that is attached to the tilting frame by screws 20 and 21, the same being for the purpose of regulation of the ease of movement or working of the knotter, such arrangement, together with the form of knotter itself, being common in this class of inventions.

$B^5$ represents a short shaft, which extends up through cap O', having at its lower end a crank-arm bearing an anti-friction roller, $b^5$, (shown in dotted lines, Fig. 8,) that moves in the cam-groove $m$ of the cam and gear wheel P', and on its upper end a crank-arm, $c^5$, to which is connected a link-arm, $d^5$, which in turn is connected to the bar $e^5$, carrying a spring-pawl, $e^6$, secured thereto by a screw, as shown. On rotation of the cam and gear wheel P' the crank on the lower end of the shaft $B^5$ is operated upon in such manner as to move the arm $c^5$ to plunge or send forward the bar $e^5$. This pawl engages at each stroke a tooth of a ratchet, $e^7$, that is formed on the side of a notched disk, $e^8$, and thereby revolves the disk the distance of one notch, the teeth of the ratchet and notches of the disk being so arranged with respect to each other as to effect this movement. This notched disk is of the usual form, and embracing a portion of the same is a shoe, $f^2$, that is formed with a pin, $f^3$, surrounding which is a spring, $f^4$, the said shoe being forced into contact with the edge of the disk by the action of the spring, and performing the function of holding the cord when carried up into the same by the movements of the disk until the knot has been tied. The movement of the needle being in a plane at right angles to the disk the cord is brought under and into a notch of the latter, the disk being then carried around to the next notch, thus taking the cord up into the shoe and holding it sufficiently tight until the knot has been formed and the cord severed, whereupon the return movement of the needle carries the cord back through the next succeeding notch up and in place to surround the bundle being formed at the time, and so on is the operation continued. The pin $f^3$ of the shoe moves through a bearing provided for it on the cap O', and to the rear thereof is a flat spring, $g^2$, regulated by a screw, $g^3$, by which the shoe $f^2$ is caused to press with greater or less force upon the disk, thus controlling the force necessary to a perfect operation.

The construction of the knotter proper and disk devices is in all respects common in this class of inventions, with the exception of the manner of tilting the former for the purposes described, and for this reason we do not deem it necessary to enter into a detailed explanation of the general operation of the two, as it is thought that this will be fully understood by reference to Figs. 15 to 21 inclusive of the drawings.

It may be here stated that while some of the features of construction of the knotter mechanism entire, as herein shown, are of the form ordinarily employed, their arrangement is such that the number of parts is greatly reduced, thereby rendering the same much easier and cheaper to manufacture and greatly reducing their weight. For instance, all of the parts of the mechanism as herein constituted are alone actuated by the movement of the cam and gear wheel P' and cam V', thus dispensing with much mechanism heretofore employed for a similar purpose, the means employed for tilting or throwing the knotter-frame to one side, for the purpose described, being thought to be principally new.

Figure 14:
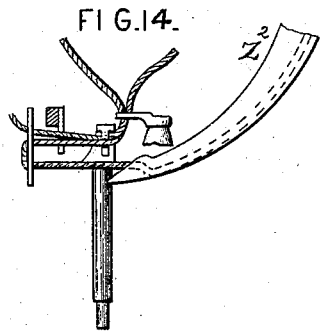
Figure 15:
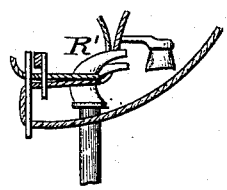
Figure 16:
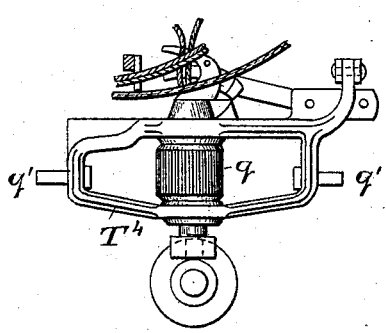
Figure 17:
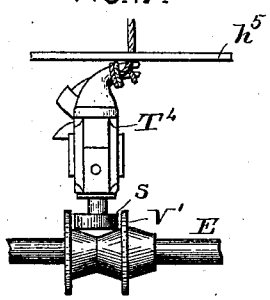
Figure 18:
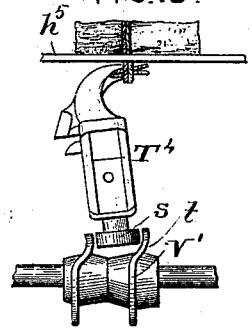
Figure 19:
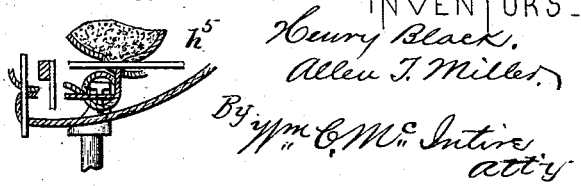

We employ a slightly concaved plate, $h^5$, (see Fig. 14,) upon which the grain is carried by the pickers, the same having a slot, $h^6$, terminating in a curve, $h^7$. The needle passes down in this slot, and in cases where any obstruction is met with in the passage of the cord therethrough the tucker $p$ always acts positively to assist it forward.

From the foregoing description it is thought the construction, arrangement, and operation of our invention will be thoroughly understood, as these have been endeavored to be so explained in the general reference to each part as not to require, it is thought, any further explanation thereof, and it may be added that such parts herein as have received no special reference are deemed to be of the form ordinarily employed and understood by those skilled in the art to which our invention appertains.

Having thus described our invention, what we claim as new, and desire to secure by Letters Patent, is—

1. In a grain-binder for harvesters, the combination, with the shaft E, of the cam V', constructed as shown, the knotter R', the lower end of whose shaft enters the groove of the cam, and the pivotally-suspended yoke in which said knotter is supported, substantially as described.

2. The combination, with the tilting knotter-frame T⁴, of the levers $u$ $v$, the link $w$, and the knife-bar $x$, operating and arranged substantially as shown and described.

3. The combination, with the shaft E, bearing beveled gear-wheel U', of the cam and gear wheel P', formed with cam-groove $m$, and having cogs $l$, the beveled gear-wheel Q', attached thereto, the crank-shaft $k$, bearing the tucker $p$, and adapted to be operated by the groove $m$, the knotter and its tilting frame, and devices for operating the same, all combined to operate in the manner set forth and described.

4. In a grain-binder for harvesters, the combination, with the cam and gear wheel P', having groove or channel $m$, and means for rotating the same, of the crank-shaft $k$, bearing the tucker at one end, its other end working in such groove, the double crank-shaft B⁵, also working in the groove, the link $d^5$, connected to the upper arm of said crank-shaft, the bar $e^5$, attached to the link and bearing a spring-pawl, and the notched disk formed with the ratchet, all combined and arranged as shown and described.

5. The combination, with the knotter R', bearing the pinion, its swinging supporting-yoke, of the cam and gear wheel P', having cogs $l$ on a portion of its periphery for engaging said pinion, the beveled gear-wheel Q', and the shaft E, bearing-wheel U' and cam V', substantially as described.

6. The combination, with the binder-platform having hinged board H⁴, of the shaft E, carrying the cam F', the discharge-arms, and the auxiliary shaft to which these arms are secured, provided with a crank-arm to connect with the hinged board, substantially as and for the purpose described.

7. In a grain-binder for harvesters, the combination, with the elevator belt J', of the spring-drum K', constructed of the concentric bands 9 10, spokes 12, and the pins 15, each carrying a spring, all of which are surrounded by the covering 16, substantially as shown and described.

In witness whereof we have hereunto set our hands this 8th day of March, 1886.

HENRY BLACK.
ALLEN T. MILLER.

Witnesses:
JNO. H. MARTIN,
ED. MARTIN.